Jan. 5, 1926.　　　　　J. A. SCHLEICHER　　　　　1,568,296
SPINDLE CLAMPING DEVICE
Filed July 17, 1925

John A. Schleicher
INVENTOR

George B. Willcox
ATTORNEY

Patented Jan. 5, 1926.

1,568,296

UNITED STATES PATENT OFFICE.

JOHN A. SCHLEICHER, OF SAGINAW, MICHIGAN, ASSIGNOR TO LUFKIN RULE CO., OF SAGINAW, MICHIGAN, A CORPORATION OF MICHIGAN.

SPINDLE-CLAMPING DEVICE.

Application filed July 17, 1925. Serial No. 44,396.

*To all whom it may concern:*

Be it known that I, JOHN A. SCHLEICHER, a citizen of the United States, residing at Saginaw, in the county of Saginaw and State of Michigan, have invented certain new and useful Improvements in Spindle-Clamping Devices; and I do hereby declare the following to be a full, clear, and exact description of the invention, such as will enable others skilled in the art to which it appertains to make and use the same.

This invention is a spindle clamping device adapted to be used for locking a spindle to prevent turning or moving longitudinally in its supporting bearings.

One of the many examples of the uses to which my invention may be put is in combination with micrometer calipers and depth gauges, wherein the measuring spindle can be clamped to the micrometer head, in order to preserve the exact setting of the instrument.

More specifically, my present improvement pertains to that class of spindle clamping devices in which the spindle is longitudinally slidable in a bearing, preferably a tubular sleeve or barrel, formed with a peripheral slot or opening and carrying an annular rotatable ring that normally conceals the opening. The bore of the ring is formed at one part of its inner periphery into spiral cam shape, and a clamping member, such as a movable anvil, is placed in the opening so as to be engaged by the cam face when the ring is rotated to its locked position. The frictional engagement of the anvil and the spindle locks the spindle against movement.

A micrometer spindle of the general construction above described is shown in my co-pending application, Serial No. 44,395 filed July 17, 1925.

My present improvement is particularly directed to the structure and mode of operation of the anvil member as applied in a locking device of the kind above indicated. The purposes of the present structure are to provide an anvil adapted to cooperate with the annular ring having part of its bore spirally cam shaped, as above described, and with the tubular barrel having the peripheral slot or opening, whereby certain new and useful results are attained.

Heretofore the anvil or movable plug in practice has been forced by the cam down upon the spindle to lock the latter, and the present device locks in substantially the same manner. In unlocking, however, the structure of my co-pending application, by reverse rotation of the ring, merely releases the pressure on the plug or anvil, but does not positively lift the anvil out of contact with the spindle. Consequently there was sometimes a tendency for the anvil, after having been clamped and then released, to obstruct the re-insertion of the spindle provided it had been taken out; thereby somewhat impairing the usefulness of the clamping device.

An object of my improved anvil is, therefore, to make it of such shape and construction that upon unlocking it will automatically rise to clear the spindle each time the ring is turned to unlatch.

The means by which this automatic lifting of the anvil is accomplished without the use of springs or similar devices is one of the features of my present invention.

With the foregoing and certain other objects in view, which will appear later in the specifications, my invention consists in the devices described and claimed and the equivalents thereof.

The invention is illustrated in the accompanying drawings, in which Fig. 1 is a side view of the lower part of a depth gauge micrometer, showing my improvement applied thereto.

Figure 1:
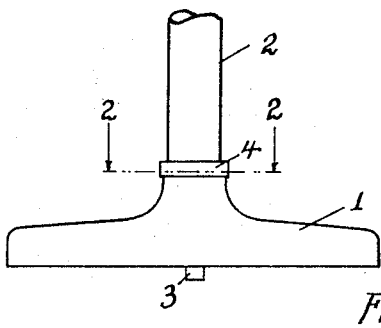

As is clearly shown in the drawings, the device as applied to a micrometer consists of the shoe 1 carrying the micrometer head or barrel 2.

The spindle 3, which is slidably received in the barrel 2 may be clamped in place by slightly turning the ring 4, which is bored to loosely fit over the barrel, one part 5 of the bore being made eccentric for the purposes previously explained.

Figure 2:
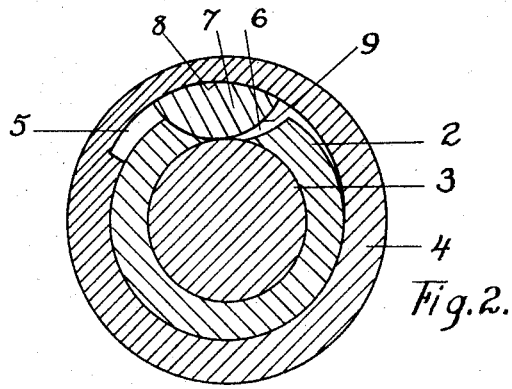
Fig. 2 is an enlarged section on the line 2—2 of Fig. 1, showing the anvil in its locked position.

The wall of the barrel 2 has a hole 6 in which the anvil 7 is loosely received, as shown in Fig. 2.

The anvil 7 preferably has its outer face 8 outwardly convex with respect to spindle 3, and its inner face 9 inwardly convex. The radius of curvature of the outer face is preferably about the same as the radius of curvature of the cam face of the ring near its point of beginning, so that when the cam is tightening the anvil against the spindle, as shown in Fig. 2, the outer face of the anvil will approximately fit the curvature of the cam.

Figure 3:
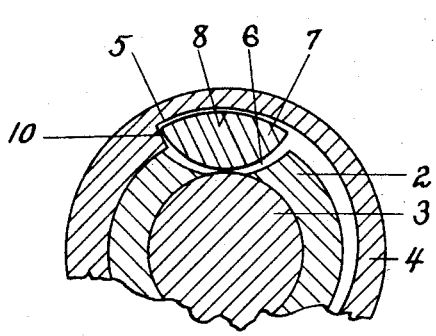
Fig. 3 is a similar view, partly broken away, showing the anvil in neutral position.
Figure 5:
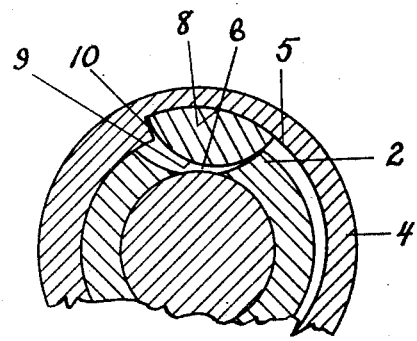
Fig. 5 is a view similar to Fig. 3, showing the anvil in raised position to clear the spindle.
Figure 4:
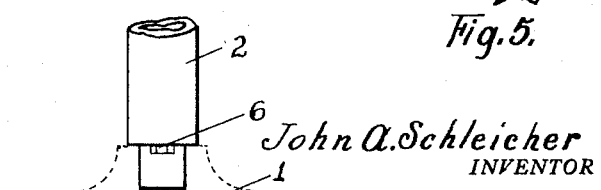
Fig. 4 is a detail of the barrel, showing the hole to receive the anvil.

When the ring 4 is turned past its loose or neutral position, Fig. 3, into its unlocked position, Fig. 5, the shoulder 10 at the end of the cam engages an edge of the anvil, which edge projects slightly beyond the outer wall of the tubular barrel 2. The opposite edge of the anvil takes against a side wall of the hole 6, as shown in Fig. 5, and a slight further rotation of the ring tilts the anvil and thereby positively lifts its inner face 9 clear of the spindle.

An important advantage of this bodily lifting of the anvil clear of the bore of barrel 2 becomes obvious when it is noted that the anvil, if loose when unlocked would drop by gravity into the bottom of the hole 6, provided the barrel 2 happened to be positioned with the hole 6 uppermost. The lower face 9 of the anvil would then project into the bore and prevent the free insertion of the spindle.

When the anvil is mechanically lifted by the co-operative action of the shoulder 10, the opposite wall of the hole 6 and the upwardly projecting edge of the anvil that is engaged by shoulder 10, it can not offer any obstruction to the insertion of the spindle, even though the barrel be positioned with the hole 6 uppermost.

While I have shown and described the device as applied to the forcible clamping of the spindle, I do not restrict it to that use, but may employ it also upon occasion as a stop to prevent the insertion of a spindle into the bore or channel. When the ring is turned to its clamping position, the anvil projects far enough into the bore of barrel 2 to prevent a close fitting spindle from being pushed through the barrel. But when the ring is turned to its unlocked position it moves the anvil clear of the bore, so that the spindle can be pushed through.

Having thus described my invention, what I claim and desire to secure by Letters Patent is:

1. A spindle clamping device comprising a tubular spindle-receiving member provided with a hole through the wall thereof, an anvil loosely received in said hole and tiltable therein, a ring rotatable on said tubular member and provided with an internal cam adapted to engage said anvil to clamp said spindle, said ring formed with a shoulder at an end of said cam, said shoulder adapted to engage said anvil to move it out of contact with said spindle.

2. In combination, a member formed with a bore and provided with a hole through the wall of said member, an anvil loosely received in said hole and tiltable therein, a ring rotatable on said bored member and provided with an internal cam adapted to engage said anvil and force a part of said anvil into said bore, said ring formed with a shoulder at an end of said cam, said shoulder adapted to engage said anvil to withdraw it from said bore.

3. In combination, a tubular member provided with a hole through the wall thereof, an anvil loosely received in said hole, a ring rotatable on said tubular member, means on said ring for projecting a part of said anvil into the bore of said tubular member, said ring formed with an internal shoulder adapted to engage a side of said anvil to move it outward, for the purposes set forth.

4. In combination, in a tubular member provided with a hole through the wall thereof, an anvil loosely received in said hole, the outer and inner faces of said anvil concave, a ring rotatable on said tubular member, means on said ring for projecting a part of the concave face of said anvil into the bore of said tubular member, said ring formed with an internal shoulder adapted to engage a lateral edge of said anvil to move it outward, for the purposes set forth.

In testimony whereof I affix my signature.

JOHN A. SCHLEICHER.